United States Patent
Lee et al.

(10) Patent No.: US 10,095,313 B2
(45) Date of Patent: Oct. 9, 2018

(54) INPUT DEVICE, VEHICLE HAVING THE INPUT DEVICE, AND METHOD FOR CONTROLLING THE VEHICLE

(71) Applicant: HYUNDAI MOTOR COMPANY, Seoul (KR)

(72) Inventors: Jeong-Eom Lee, Yongin-si (KR); Jungsang Min, Seoul (KR); Gi Beom Hong, Bucheon-si (KR); Sihyun Joo, Seoul (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 236 days.

(21) Appl. No.: 14/941,514

(22) Filed: Nov. 13, 2015

(65) Prior Publication Data
US 2017/0010675 A1    Jan. 12, 2017

(30) Foreign Application Priority Data
Jul. 9, 2015    (KR) .................. 10-2015-0097519

(51) Int. Cl.
*G06F 3/01* (2006.01)
*B60R 16/037* (2006.01)
*G06F 3/03* (2006.01)
*B60K 37/06* (2006.01)

(52) U.S. Cl.
CPC .............. *G06F 3/017* (2013.01); *B60K 37/06* (2013.01); *G06F 3/0304* (2013.01); *B60K 2350/1012* (2013.01); *B60K 2350/406* (2013.01)

(58) Field of Classification Search
CPC ....... G06F 3/017; G06F 3/0304; B60K 37/06; B60K 2350/406; B60K 2350/1012
See application file for complete search history.

(56) References Cited

U.S. PATENT DOCUMENTS

| 2003/0056997 | A1* | 3/2003 | Breed | B60N 2/002 |
| | | | | 177/144 |
| 2003/0086588 | A1* | 5/2003 | Shinada | B60R 25/04 |
| | | | | 382/104 |
| 2003/0234550 | A1* | 12/2003 | Brooks | B60N 2/4646 |
| | | | | 296/24.46 |
| 2010/0226539 | A1* | 9/2010 | Ishii | G06F 3/0425 |
| | | | | 382/104 |
| 2015/0212581 | A1* | 7/2015 | Kawalkar | G06F 3/017 |
| | | | | 701/3 |
| 2015/0370329 | A1* | 12/2015 | Koyama | G06F 3/016 |
| | | | | 345/173 |

(Continued)

FOREIGN PATENT DOCUMENTS

| JP | 2002-293153 A | 10/2002 |
| JP | 2009-083731 A | 4/2009 |

(Continued)

OTHER PUBLICATIONS

English translation of Korean Notice of Allowance dated Jan. 2, 2017, issued in Korean Application No. 10-2015-0097519.

*Primary Examiner* — Ibrahim A Khan
(74) *Attorney, Agent, or Firm* — McDermott Will & Emery LLP

(57) ABSTRACT

An input device includes an input module, a detector for detecting a position of a wrist of a user, and a controller for controlling a movement of the input module based on information about the position of the wrist of the user detected by the detector.

20 Claims, 17 Drawing Sheets

(56) References Cited

U.S. PATENT DOCUMENTS

2016/0185309 A1* 6/2016 Di Censo .............. B60R 16/037
                                                            701/49
2016/0306424 A1* 10/2016 Vanhelle ................... G06F 3/01
2016/0368382 A1* 12/2016 Schlittenbauer ....... B60K 37/06

FOREIGN PATENT DOCUMENTS

| | | |
|---|---|---|
| JP | 2009-132263 A | 6/2009 |
| JP | 2009-208716 A | 9/2009 |
| KR | 10-0747163 B1 | 8/2007 |
| KR | 10-2009-0063320 A | 6/2009 |
| KR | 10-1013902 B1 | 2/2011 |

* cited by examiner

INPUT DEVICE, VEHICLE HAVING THE INPUT DEVICE, AND METHOD FOR CONTROLLING THE VEHICLE

CROSS-REFERENCE TO RELATED APPLICATION(S)

This application claims, under 35 U.S.C. § 119(a), the benefit of priority to Korean patent application 10-2015-0097519, filed on Jul. 9, 2015 with the Korean Intellectual Property Office, the entire disclosure of which is incorporated hereby incorporated by reference.

TECHNICAL FIELD

The present disclosure relates to a movable input device, a vehicle having the input device, and a method for controlling the vehicle.

BACKGROUND

Vehicles are commonly equipped with various equipment for interactions with a driver, such as an air conditioner or an Audio Video and Navigation (AVN) system.

The driver operates the various equipment of the vehicle by manipulating different input devices inside the vehicle. Such manipulation may cause a visual distraction and call away the driver's attention from driving. Accordingly, a need exists for an input device that is easy for a driver to manipulate.

SUMMARY

The present disclosure provides an input device for vehicle, which is movable to a position allowing the driver to easily manipulate the input device, vehicle having the input device, and method for controlling the vehicle.

In accordance with an aspect of the present disclosure, an input device is provided. The input device includes an input module; a detector for detecting a position of a wrist of a user; and a controller for controlling a movement of the input module based on information about the position of the wrist of the user detected by the detector.

The controller may be configured to control the input module to be moved to a point located a predetermined first distance away from the position of the wrist of the user detected by the detector.

The detector may include a bio-signal sensor for collecting a biological signal of the user.

The bio-signal sensor may include at least one selected from a group including a Charge Coupled Device (CCD) camera module and a photoplethysmography (PPG) sensor module.

The input device may further include an arm rest on which the user rests his/her arm, the arm rest including a first arm rest that constitutes an exterior and a second arm rest movably formed inside the first arm rest.

The detector may include a pressure sensor installed inside the first arm rest for collecting data of pressure applied onto the first arm rest, and a bio-signal sensor installed inside the second arm rest for collecting a biological signal of the user.

The bio-signal sensor may be movably formed inside the second arm rest.

The controller may control movement of the second arm rest based on pressure information collected from the pressure sensor.

The controller may determine a position of an elbow of the user based on the pressure information collected from the pressure sensor, and control the second arm rest to be moved to a point located a predetermined second distance away from the determined position of the elbow.

The controller may control the input module to be moved to a predetermined reference position if the vehicle is started.

The controller may control the input module to be moved to a predetermined initial position if an engine of the vehicle is turned off.

In accordance with another aspect of the present disclosure, a vehicle is provided. The vehicle includes an input module for receiving a control command; a detector for detecting a position of a wrist of a user; and a controller for controlling a movement of the input module based on information about the position of the wrist of the user detected by the detector.

The controller may be configured to control the input module to be moved to a point located a predetermined first distance away from the position of the wrist of the user detected by the detector.

The detector may include a bio-signal sensor for collecting a biological signal of the user.

The input device may further include an arm rest on which the user rests his/her arm, the arm rest including a first arm rest that constitutes an exterior and a second arm rest movably formed inside the first arm rest.

The detector may include a pressure sensor installed inside the first arm rest for collecting data of pressure applied onto the first arm rest, and a bio-signal sensor installed inside the second arm rest for collecting a biological signal of the user.

The bio-signal sensor may be movably formed inside the second arm rest.

In accordance with another aspect of the present disclosure, a method for controlling a vehicle is provided. The method includes collecting, by a bio-signal sensor, a biological signal of a user; detecting a position of a wrist of the user from the collected biological signal data; and controlling the input module to be moved to a point located a predetermined first distance away from the position of the wrist based on the detected information about the position of the wrist.

The vehicle may include a first arm rest that constitutes an exterior and a second arm rest movably formed inside the first arm rest, and the method may further include collecting data of pressure applied onto the first arm rest; detecting a position of an elbow of the user from the collected data of pressure; and controlling the second arm rest to be moved to a point located a predetermined second distance away from the position of the elbow based on the detected information about the position of the elbow.

Collecting, by a bio-signal sensor, a biological signal of a user may include collecting a biological signal of the user while the bio-signal sensor is moving back and forth.

Other aspects, advantages, and salient features of the disclosure will become apparent to those skilled in the art from the following detailed description, which, taken in conjunction with the annexed drawings, discloses exemplary embodiments of the disclosure.

BRIEF DESCRIPTION OF THE DRAWINGS

The above and other features and advantages of the present disclosure will become more apparent by describing in detail exemplary embodiments thereof with reference to the attached drawings in which.

Throughout the drawings, like reference numerals will be understood to refer to like parts, components, and structures.

DETAILED DESCRIPTION

Embodiments of a vehicle and method for controlling the same will now be described with reference to accompanying drawings.

Figure 1:
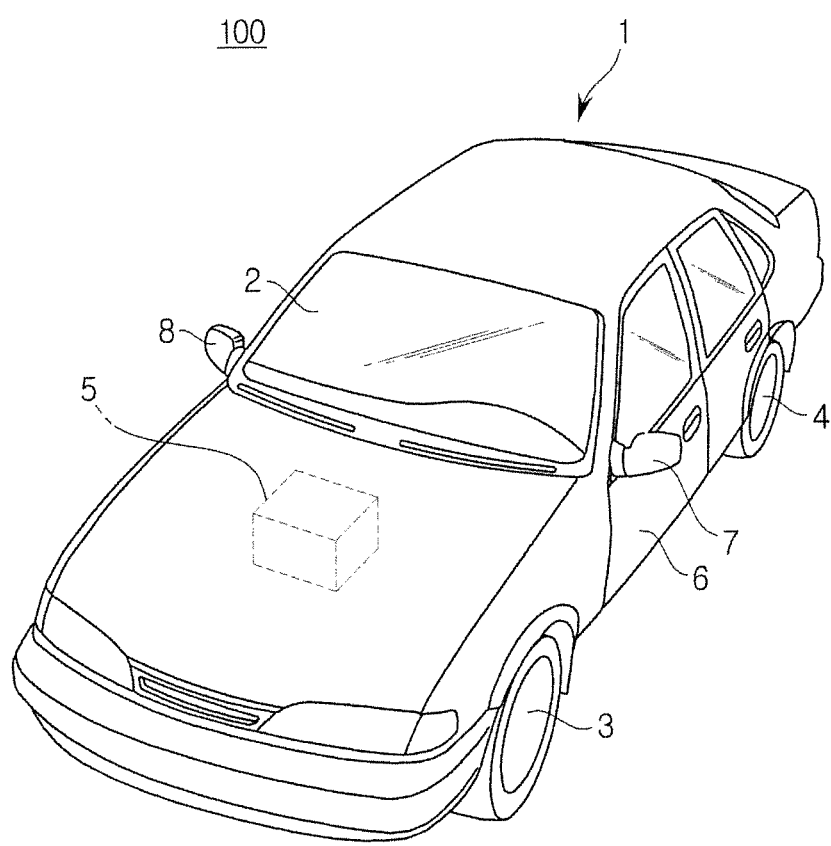
FIG. 1 shows an exterior of a vehicle, according to an embodiment of the present disclosure.

FIG. 1 shows an exterior of a vehicle 100, according to an embodiment of the present disclosure.

Referring to FIG. 1, the vehicle 100 may include a main body 1 that constitutes an exterior of the vehicle 100, a front glass 2 that allows the driver inside the vehicle 100 to look ahead of the vehicle 100, wheels 3, 4 for moving the vehicle 100, a driving system 5 for turning the wheels 3, 4, doors 6 that shield the inside of the vehicle 100 from outside, and side mirrors 7, 8 that help the driver see areas behind and to the sides of the vehicle 100.

The front shield 2, also termed as a windshield glass, may be placed on the top front of the main body 100 for securing a front view for the driver inside the vehicle 100.

The wheels 3 and 4 include front wheels 3 and rear wheels 4, and the driving system 5 may provide turning forces to the front wheels 3 or rear wheels 4 to move the vehicle 100 forward or backward. The driving system 5 may employ a motor that produces the turning force from electrical power supplied from a storage battery (not shown) or a combustion engine (not shown) that burns a fuel to create the turning force.

The doors 6 may be pivotally attached onto the left and right sides of the main body 1, and opened for the driver and passenger to get in or get out of the vehicle 100 and closed for shielding the inside of the vehicle 100 from the outside. The doors 6 may have windows installed thereon for the driver and passenger to look in or out through the windows. In some embodiments, the windows may be installed to have only one viewable side and be opened and closed.

The side mirrors 7 and 8 include a left side mirror 7 and a right side mirror 8 placed on the left and right sides of the main body 1, respectively, for helping the driver obtain views behind and to the side of the vehicle 100.

Figure 2:
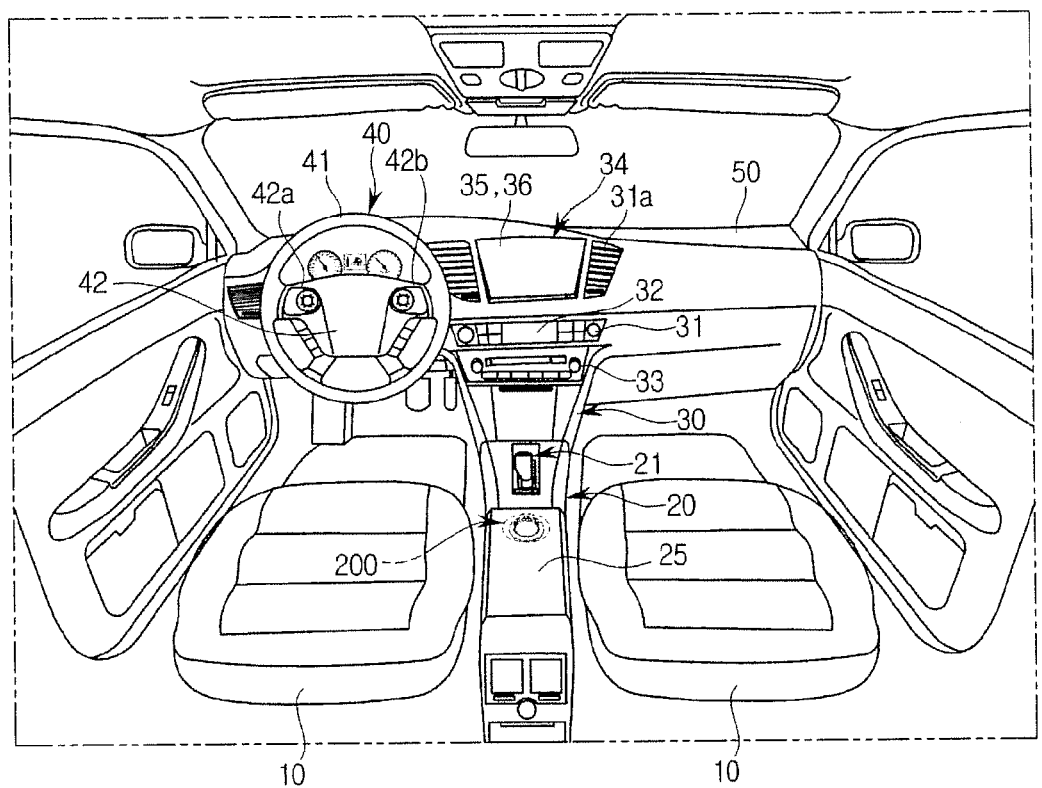
FIG. 2 shows an interior of a vehicle, according to an embodiment of the present disclosure.

FIG. 2 shows an interior of the vehicle 100, according to an embodiment of the present disclosure. Referring to FIG. 2, the vehicle 100 may include seats 10 reserved for driver and passengers to sit on, a center console 20, a center facia 30 and a dashboard 50 having a steering wheel 40.

The center console 20 may be placed between the driver seat 10 and a passenger seat next to the driver seat 10 to partition the seats. The center console 20 may include a gear box that contains a gear system. Transmission shift levers 21 for gearshifting may be installed in the gear box.

An arm rest 25 may be placed behind the center console 20 for the driver or passenger to rest his/her arm thereon. The arm rest 25 is a part for the driver or passenger to rest his/her arm thereon to achieve a comfortable posture in the vehicle 100, and there may be sensors installed inside the arm rest 25 for collecting information regarding an arm of the driver or passenger.

An input device 200 for receiving control commands for the vehicle 100 may be placed in the center console 20. The driver may use the input device 200 to change settings of the vehicle 100 or may control various convenience systems included in the vehicle 100. The input device 200 may be movably arranged to allow the driver to easily manipulate the input device 200, which will be described later.

In the center facia 30, an air conditioner 31, a clock 32, an audio system 33, and an Audio, Video, and Navigation (AVN) system 34 may be installed.

The air conditioner 31 keeps the atmosphere inside the vehicle 100 pleasant by controlling temperature, humidity, air quality, and air flows inside the vehicle 100. The air conditioner 31 may include at least one vent 31a installed in the center facia 30 for venting air. There may also be buttons or dials installed in the center facia 30 to control e.g., the air conditioner 31. The driver or the user may control the air conditioner 31 with the buttons arranged on the center facia 30.

The clock 32 may be mounted around the buttons or dials for controlling the air conditioner 31.

The audio system 33 may include a control panel on which a number of buttons are mounted to perform functions of the audio system 33. The audio system 133 may provide a radio mode for radio listening and a media mode for reproducing audio files stored in various storage media.

The AVN system 34 may be embedded in the center facia 30 of the vehicle 100. The AVN system 34 is a system for comprehensively performing audio, video and navigation functions of the vehicle 100 according to manipulations of the user. The AVN system 34 may include an input unit 35 for entering user commands regarding the AVN system 34, and a display 36 for displaying a screen related to audio play, video play, or navigation.

The steering wheel 40 is a tool to control a traveling direction of the vehicle 100, including a rim 41 to be held by the driver and a spoke 42 connected to a steering system of the vehicle 100 for connecting the rim 41 to a hub of a rotation shaft for steering. In an embodiment, control devices 42a, 42b may be formed on the spoke 42 to control various devices, e.g., the audio system.

In an embodiment, the dashboard 50 may include various instrument panels to indicate traveling speeds of the vehicle 100, engine rpm, fuel gauge, or the like, and a glove box.

Figure 3:
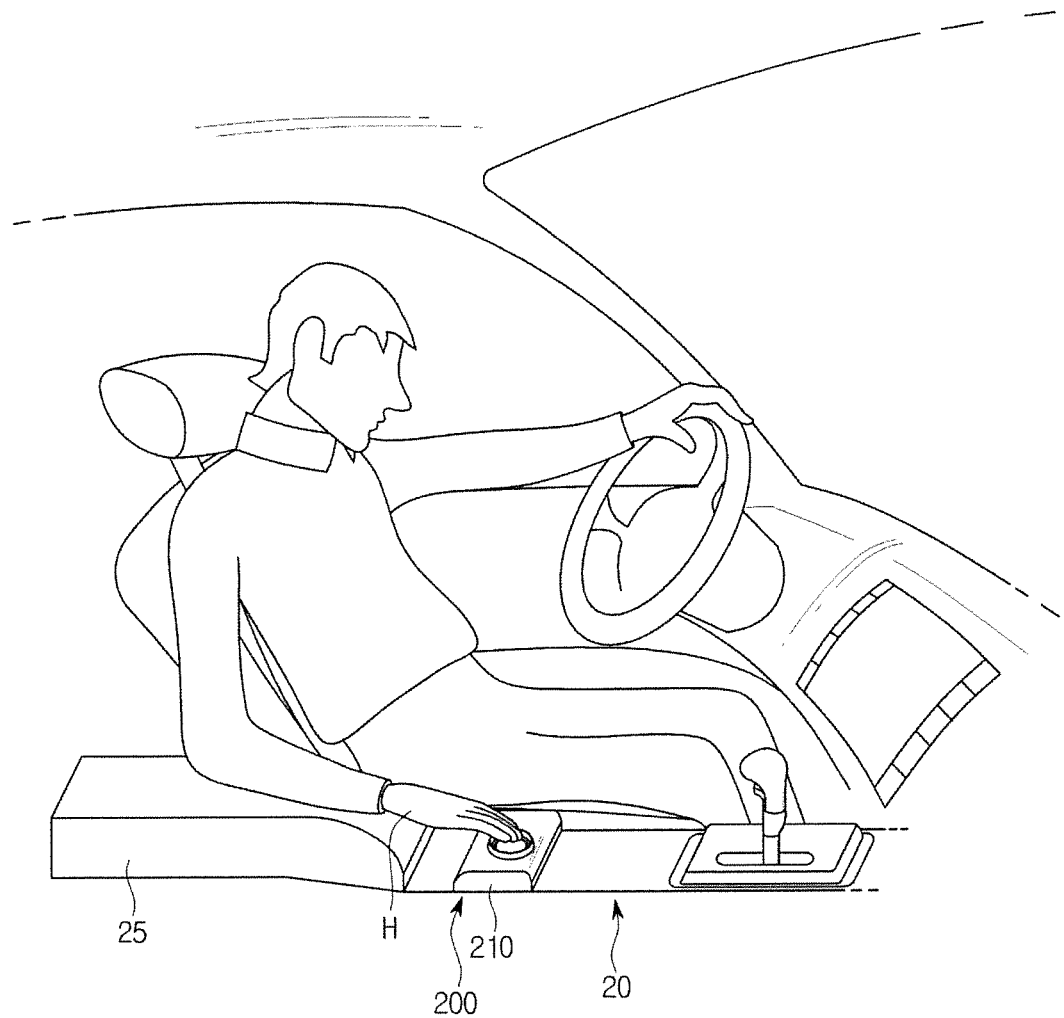
FIGS. 3 to 5 show views for explaining movement of an input device.
Figure 4:
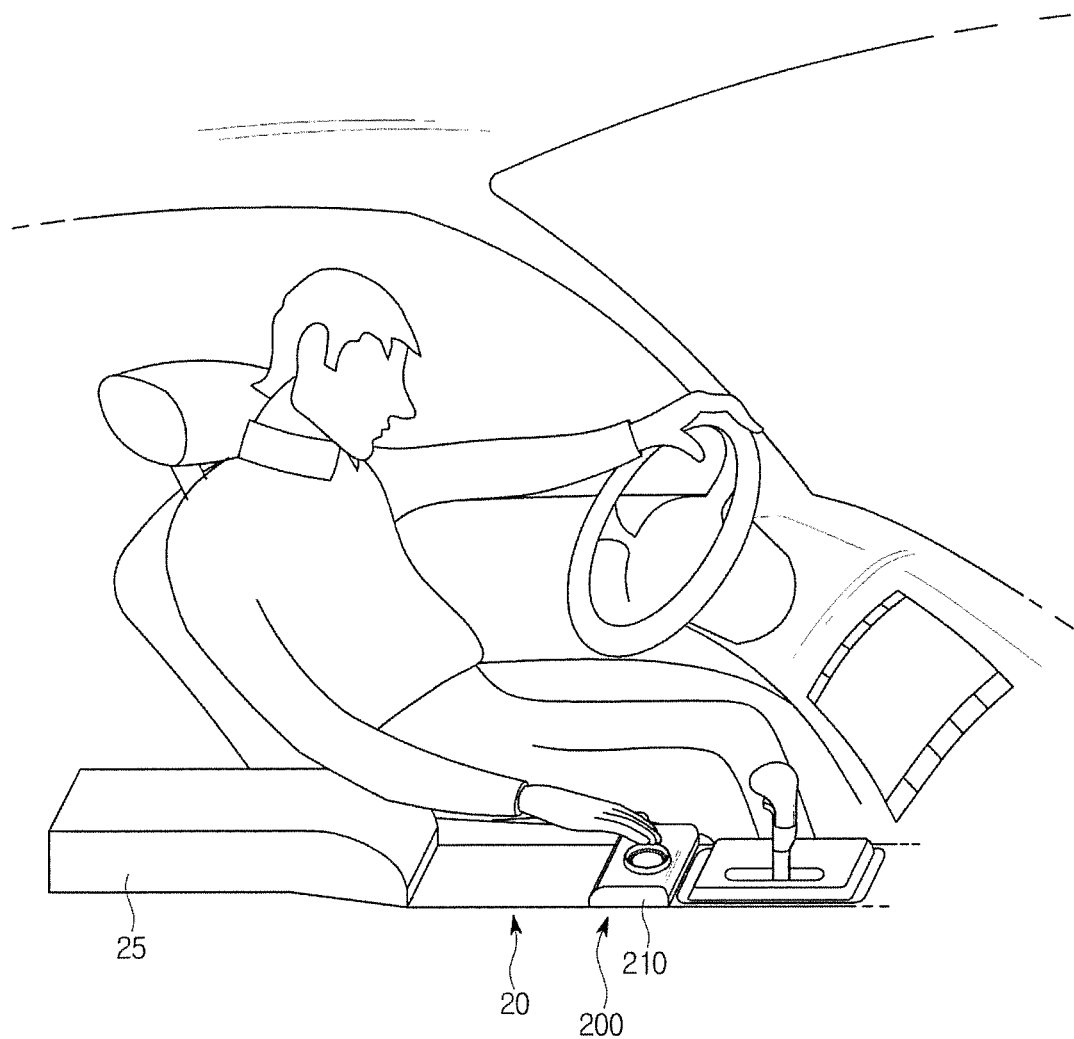
Figure 5:
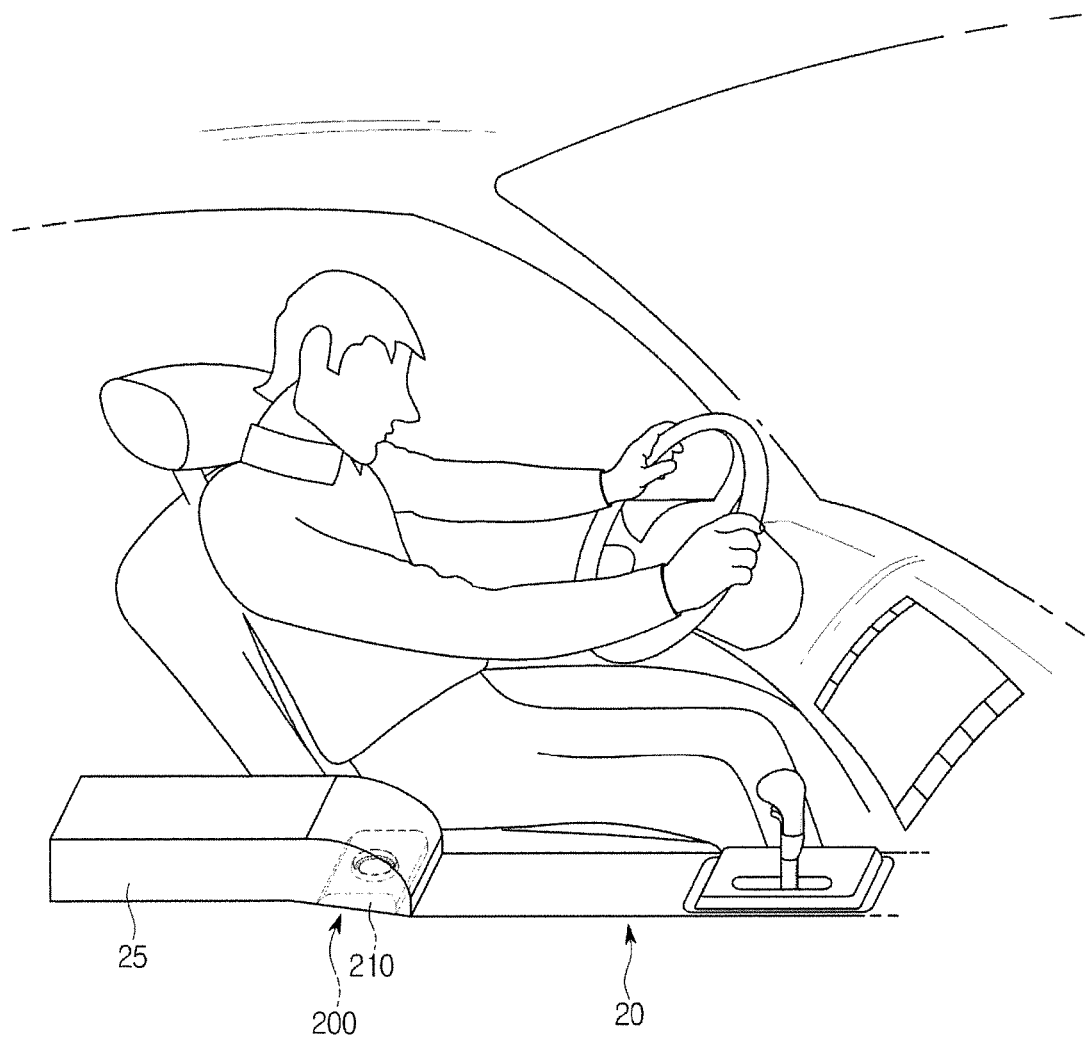

The input device 200 arranged to be movable in accordance with an embodiment of the present disclosure will now be described in more detail. FIGS. 3 to 5 show views for explaining movement of the input device 200 according to an embodiment of the present disclosure. FIG. 3 shows the input device 200 placed in a first position, FIG. 4 shows the input device 200 placed in a second position, and FIG. 5 shows the input device 200 placed in an initial position.

To allow the user to easily manipulate the input device 200, the input device 200 needs to be in a position that corresponds to a hand of the user. Since the position where the hand of the user is naturally placed may vary with physical characteristics of the user, such as the user's sitting posture, height, arm length, or the like, a need may exist to adjust the position of the input device 200 according to the condition of the user. Thus, the input device 200 equipped in the vehicle 100 in accordance with an embodiment of the present disclosure may be arranged to be movable to a position allowing the user to easily manipulate the input device 200.

Specifically, an input module 210 of the input device 200 may be moved to a position corresponding to a hand H of the user, as shown in FIGS. 3 and 4. As such, as the input module 210 of the input device 200 is moved according to a position of the hand H, the user may better manipulate the input device 200 and visual distraction of the user to the input device 200 may also be minimized.

In an embodiment, the input module 210 of the input device 200 may be moved to an initial position if there is no need to manipulate the input device 200. For example, while the vehicle 100 is running on the highway as shown in FIG. 5, or while the engine of the vehicle 100 is turned off, there is no need to manipulate the input device 200, in which case the input module 210 of the input device 200 may be moved to the initial position. The initial position may refer to a position set up in advance by the user or the manufacturer of the vehicle 100. For example, the initial position may be located inside the arm rest 25 as shown in FIG. 5, but is not limited thereto. In the case that the input device 200 is located inside the arm rest 25 as shown in FIG. 5, possible contamination of the input device 200 may be minimized.

Figure 6:
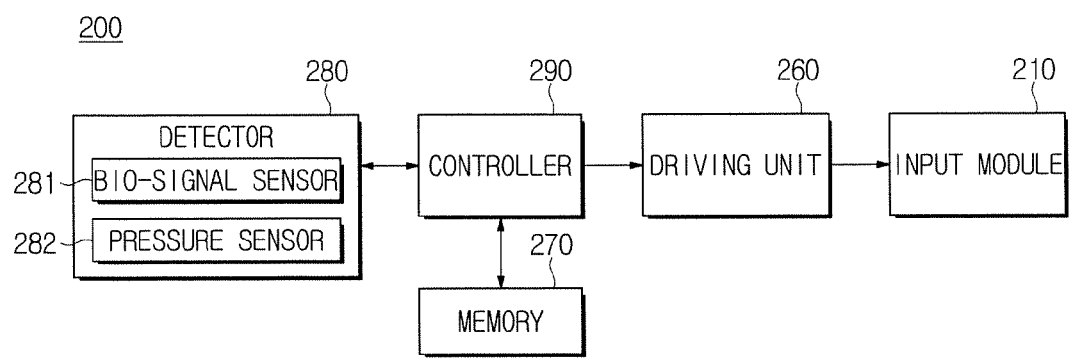
FIG. 6 is a control block diagram of an input device, according to an embodiment of the present disclosure.

FIG. 6 is a control block diagram of the input device 200, according to an embodiment of the present disclosure. The vehicle 100 may include the same features as shown in FIG. 6, and the following description will focus on features of the input device 200.

Referring to FIG. 6, the input device 200 may include an input module 210 for receiving a control command from the user, a driving unit 260 for driving the input module 210, a memory 270, a detector 280 for detecting a position of a wrist of the user, and a controller 290 for controlling general operations of the input device 200.

The input module 210 may convert a control command input from the user to an electric signal and send the electric signal to the controller 290. A specific embodiment of the input module 210 will be described in more detail in connection with FIGS. 7 and 8.

Figure 7:
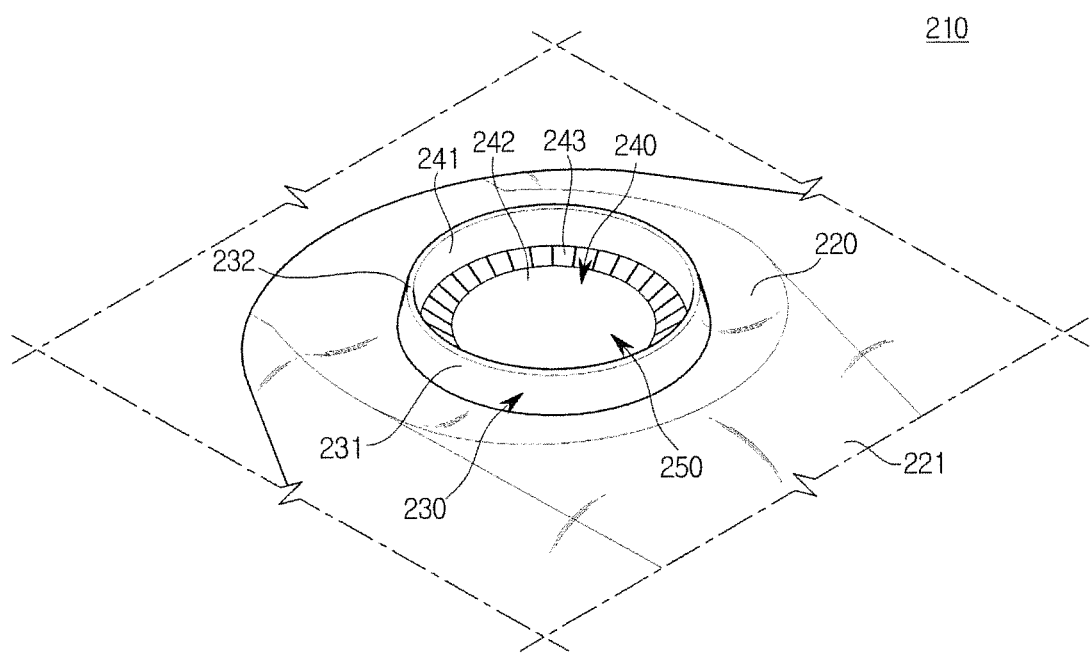
FIG. 7 shows an input module of an input device equipped in a vehicle, according to an embodiment of the present disclosure.

FIG. 7 shows the input module 210 of the input device 200 equipped in the vehicle 100, according to an embodiment of the present disclosure.

Referring to FIG. 7, the input module 210 of the input device 200 may be implemented as a concave input module 210. Specifically, the concave input module 210 may include a mounting face 220, a projecting part 230 installed on the mounting face 220 to protrude from the mounting face 220, a recess 240 formed to be recessed on the inside of the projecting part 230, and a touching part 250 formed on the bottom face of the recess 240. The projecting part 230, recess 240, and touching part 250 may be integrally formed, or combined into one structural unit.

The mounting face 220 may constitute the overall appearance of the concave input module 210, and may be formed of a separate substance from that of the projecting part 230, the recess 240, and the touching part 250, but is not limited thereto.

The mounting face 220 may be implemented in a flat form, but is not limited thereto and may be implemented in a convex or concave form in some other embodiments.

Although not shown in FIG. 7, the input module 210 may further include another input means. For example, a push button or membrane button may be mounted on the mounting face 220 to input a control command, and a toggle switch may be mounted on the projecting part 230 or recess 240.

The projecting part 230 may be formed to protrude from the mounting face 220. Specifically, the projecting part 230 may include an outer side 231 connected to the mounting face 220 and a ridge 232 connected to the outer side 231. The outer side 231 may be arranged between the mounting face 220 and the ridge 232 with a predetermined curvature to connect the mounting face 220 and the ridge 232, but is not limited thereto.

The ridge 232 may have a form that corresponds to the recess 240, e.g., a ring form. However, the ridge 232 is not limited thereto, but may have a form depending on the form of the touching part 250 of the concave input module 210.

The recess 240 may be formed to be recessed from the ridge 232 toward the inside of the projecting part 230. The recess 240 may include an opening with a ring-shaped horizontal cross-section. For example, the recess 240 may have a form that is opened in a ring form at the ridge 232 and inwardly recessed from the opening.

The recess 240 may include an inner side 241 connected to the ridge 232 and a bottom part 242 having the touching part 250 formed thereon. As an example, the inner side 241 shaped like the inside of a cylinder and the bottom part 242 shaped like a flat circle are shown in FIG. 7.

The recess 240 may include a connecting part 243 to connect the inner side 241 and the bottom part 242. The connecting part 243 may have the form of a curved face with a tilting or negative curvature. The negative curvature may refer to a curvature that makes the curved face look concave when viewed from outside of the recess 240. The connecting part 243 may be graduated at predetermined intervals to help the user make intuitive touch inputs, and the graduations may be embossed or engraved.

When the user makes a touch input across the connecting part 243, the user may make more intuitive touch inputs due to a tactile stimulus from the graduations.

The bottom part 242 may include the touching part 250, which may receive touch inputs of the user. For this, the touching part 250 may include a touch pad for recognizing contacts or approximations of the user's finger or a pointer like a touch pen. The touch pad may be implemented in a resistive, optical, capacitive, ultrasonic, or pressurized way, but the way of recognizing contacts or approximations of the user is not limited thereto.

The touching part 250 may be formed to have a curved face with a predetermined curvature. For example, the touching part 250 may have a downwardly concave form, but the form of the touching part 250 is not limited thereto. For example, the touching part 250 may have a flat form, or may have an upwardly convex form.

A touch pad may also be formed on the connecting part 243 for receiving touch inputs of the user. In this case, a single touch pad is contained in the bottom part 242 and connecting part 243 for receiving the user's touch inputs on the bottom part 242 and the connecting part 243 at the same time. The bottom part 242 and the connecting part 243 may be implemented with different touch pads if necessary.

On the mounting face 220, a wrist supporter 221 for supporting the user's wrist may be formed. The wrist supporter 221 may be placed at a higher level than the touching part 250. This may prevent the wrist from being bent up when the user makes an input gesture on the touching part 250 with his/her finger while resting the wrist on the wrist supporter 221, thereby preventing possible musculoskeletal disorders of the user and giving the user a more comfortable feeling of manipulation.

Figure 8:
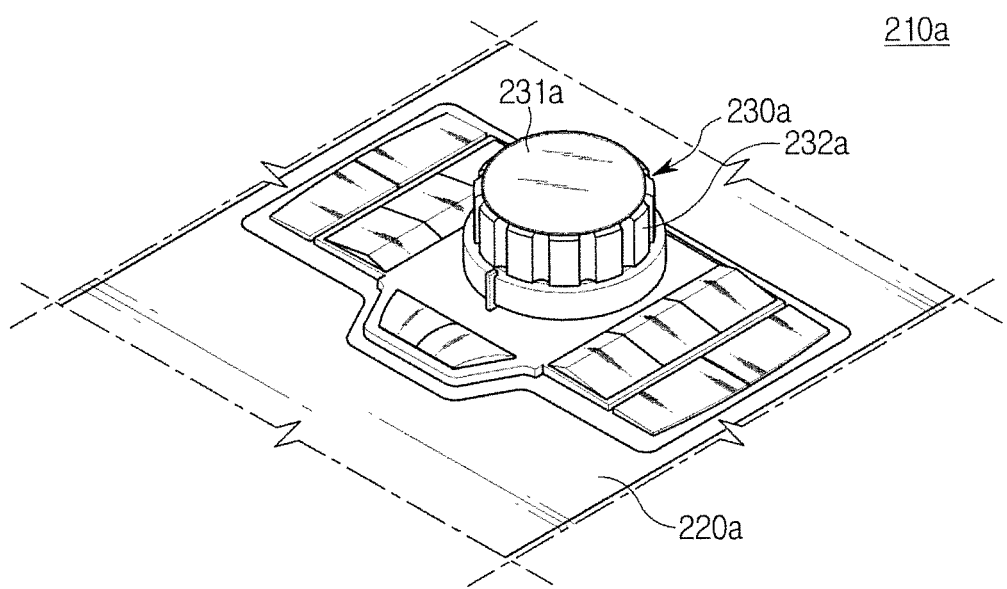
FIG. 8 shows an input module of an input device equipped in a vehicle, according to another embodiment of the present disclosure.

FIG. 8 shows the input module 210 of the input device 200 equipped in the vehicle 100, according to another embodiment of the present disclosure.

Referring to FIG. 8, an input module 210a of the input device 200 may be implemented as a dial input module 210a. Specifically, the dial input module 210a may include a mounting part 220a and a dial input part 230 formed on the mounting part 220a. The dial input part 230a may be formed to be turned around a rotation axis or tilted to one side for outputting an input signal corresponding to the turning or tilting.

A dial touching part 231a may be formed on the top of the dial input part 230a for receiving touch inputs, and a handle 232a may be formed on the side of the dial input part 230a to improve the user's sense of grip during manipulation. The user may input a control command through the touching part 231a formed on the top of the dial input part 230a, or may input a control command by gripping the handle 232a and turning the entire dial input part 230a or tilting the dial input part 230a to a side.

The dial input module 210 may have a key control unit around the dial input part 230a to improve the user's convenience of manipulation, and in this regard, descriptions overlapping with what was described above will be omitted herein.

The input module 210 may be movably formed. More specifically, the input module 210 may be formed to be movable to a position for the user to conveniently manipulate the input module 210.

Figure 9:
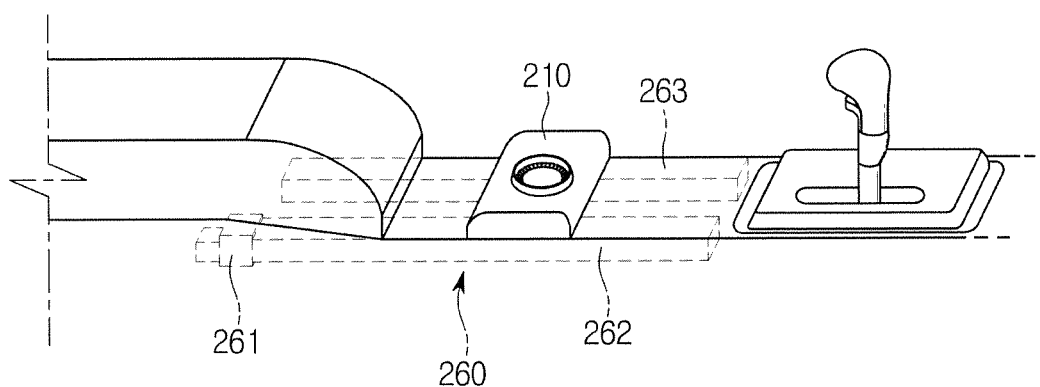
FIG. 9 shows a schematic driving unit of an input device, according to an embodiment of the present disclosure.
Figure 10:
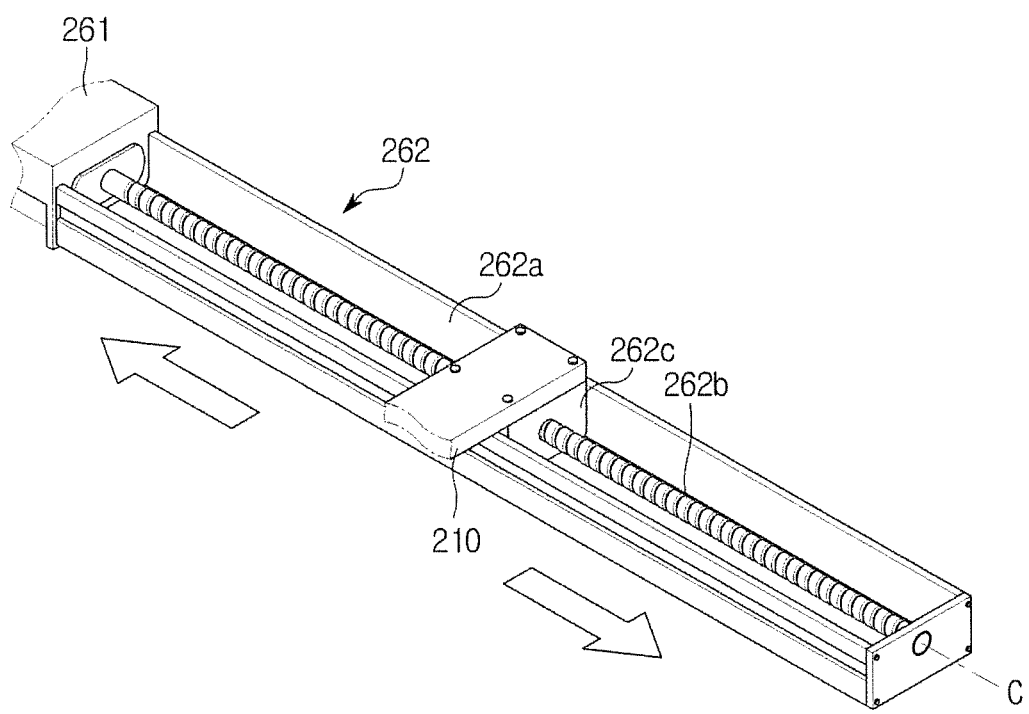
FIG. 10 shows a view for explaining transfer of a driving force of a driving unit, according to an embodiment of the present disclosure.
Figure 11:
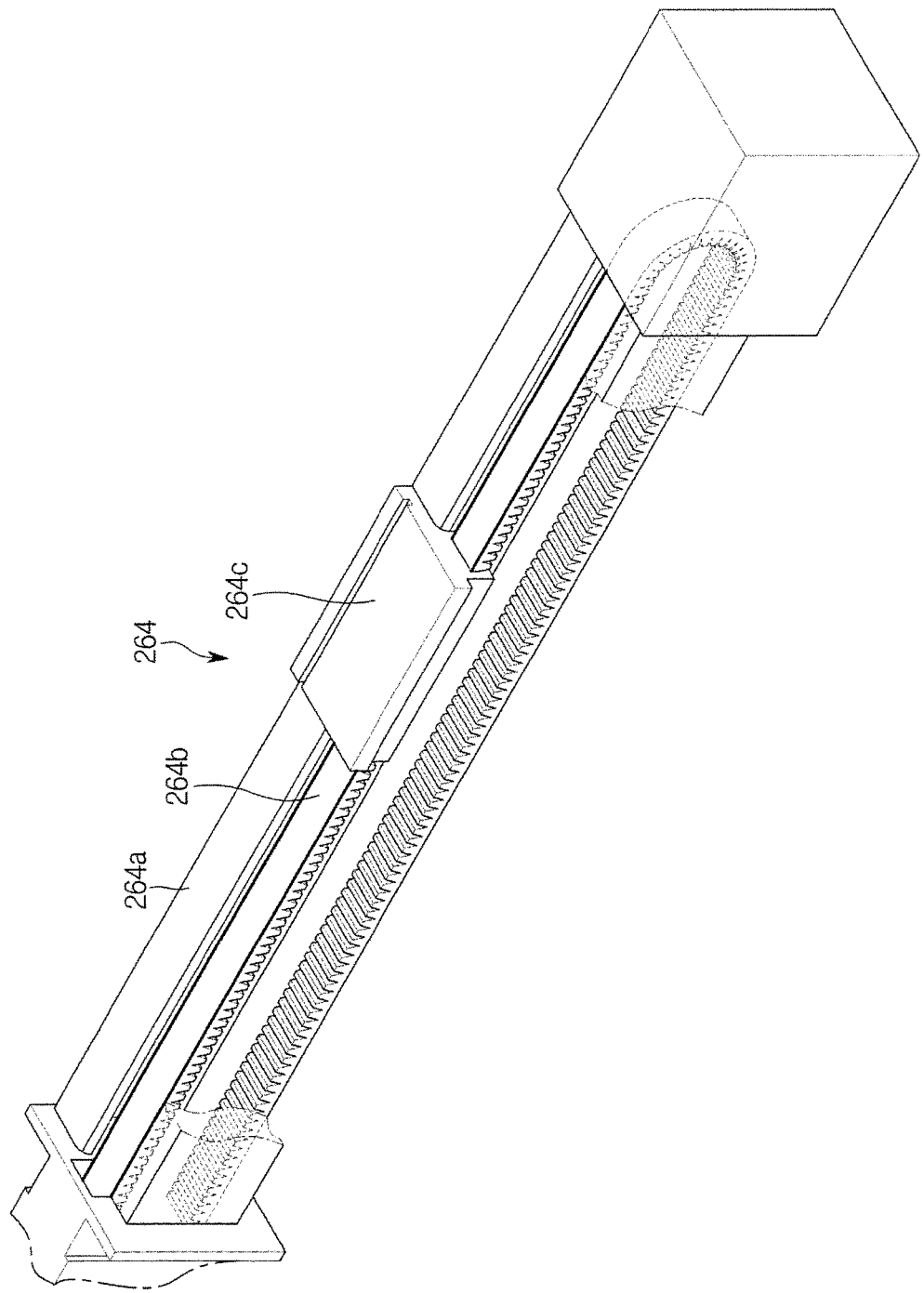
FIG. 11 shows a view for explaining transfer of a driving force of a driving unit, according to another embodiment of the present disclosure.

The input module 210 may be driven by the driving unit 260 of the input device 200, which will be described in more detail in connection with FIGS. 9 to 11. FIG. 9 schematically shows the driving unit 260 of the input device 200, according to an embodiment of the present disclosure, FIG. 10 shows a view for explaining transfer of driving force of the driving unit 260, according to an embodiment of the present disclosure, and FIG. 11 shows a view for explaining transfer of driving force of the driving unit 260, according to another embodiment of the present disclosure.

The driving unit 260 may drive the input device 200 based on a control of the controller 290. In other words, the driving unit 260 may move the input module 210 back and forth or to the left or right under control of the controller 290. Although FIGS. 9 to 11 illustrate that the driving unit 260 is configured to drive the input device 200 back and forth, the same features of the driving unit 260 of FIGS. 9 to 11 may also be applied in an occasion where the driving unit 260 drives the input device 200 to the left or right. An occasion where the input device 200 is driven back and forth will now be described.

Referring to FIG. 9, the driving unit 260 is placed on the center console 20, and may include a driving motor 261 for creating a driving force, a first guide 262 for moving the input device 200 with the driving force created by the driving motor 261, and a second guide 263 for assisting movement of the input device 200.

The driving motor 261 may be implemented by a stepping motor capable of controlling the rotation angle.

As shown in FIG. 10, the first guide 262 may include a housing 262a that constitutes the exterior, a screw shaft 262b arranged inside the housing 262a, and a transfer member 262c that is moved back and forth according to a rotation of the screw shaft 262b.

Specifically, the screw shaft 262b may be connected to the driving motor 261 and may be rotated about a rotation axis C when the driving motor 261 is driven, and conchoids may be formed on the screw shaft 262b. The transfer member 262c may be combined with the conchoids of the screw shaft 262b, and one face of the transfer member 262c may be combined with the input module 210. When the screw shaft 262b is rotated by the driving motor 261, the transfer member combined with the screw shaft 262b may be moved back and forth along the conchoids of the screw shaft 262b. Accordingly, the input module 210 combined with the transfer member 262c may be moved. A direction in which the transfer member 262c is moved may be determined according to the rotation direction of the screw shaft 262b.

The second guide 263 is combined with the input module 210 to guide the input module 210 that is moved back and forth by the first guide 262 to move straight.

While it is described in FIG. 10 that the driving unit 260 moves the input module 210 by controlling rotation of the screw shaft 262b, the method for driving the input device 200 is not limited thereto, but may include various combinations of devices that are able to move the input module 210. For example, the first guide 262 may be replaced by a third guide 264 as shown in FIG. 11, the third guide 264 including a housing 264a that constitutes the exterior, a driving belt 264b that extends along the longitudinal direction of the housing 264a to form a closed curve that is rotating in the longitudinal direction, and a transfer member 264c that is moved by the driving belt 264b. Driving forces created by the driving motor 261 may be transferred to the input module 210 by the driving belt 264b.

The detector 280 may detect a position of a wrist of the user. More specifically, the detector 280 may collect a biological signal of the user to detect the position of a wrist of the user.

Accordingly, the detector 280 may include a bio-signal sensor 281 for collecting biological signals of the user. The bio-signal sensor 281 may be mounted inside the arm rest 25 on which the user's arm is rested. The bio-signal sensor 281 may be formed inside the arm rest 25 to be moved back and forth in an embodiment, or to be rotated in place in another embodiment. In the case that the bio-signal sensor 281 is formed inside the arm rest 25 to be moved back and forth, the bio-signal sensor 281 may collect biological signals of a wrist of the user while moving along a rail formed inside the arm rest 25, and in the case that the bio-signal sensor 281 is formed to be rotated in place, the bio-signal sensor 281 may collect biological signals of the wrist of the user while rotating at a fixed place. Alternatively, the bio-signal sensor 281 may collect biological signals of the wrist of the user while moving along the rail and simultaneously rotating around the rotation axis. In the case where the bio-signal sensor 281 collects biological signals while rotating around a specific rotation axis, a wide vision may be secured as compared to the case where the bio-signal sensor 281 is fixed, and thus a wider range of biological signal data may be collected.

The bio-signal sensor 281 may include a feature that is able to collect biological signals, such as an infrared Charge Coupled Device (CCD) camera module, a photoplethysmography (PPG) sensor module, or the like.

In a method for collecting biological signals with the CCD camera module, a position of a wrist of the user may be detected by detecting a region where the veins stretching to a hand H of the user are intensely distributed. For example, the CCD camera module may include an image capturer for capturing an image of a wrist of the user and an image processor for processing the captured image to analyze the vein distribution pattern. The image capturer of the CCD camera module may include an infrared CCD camera. The image capturer may collect image data of a wrist of the user, and output the collected image data to the image processor. The image processor may extract an image of a region of interest in which veins are intensely distributed from the image data collected by the image capturer, and may extract a vein pattern of user's wrist from the extracted image of the region of interest. The image processor may output data of the extracted vein pattern of the wrist to the controller 290, which may then determine a position of the wrist by comparing the extracted vein pattern of the wrist and predetermined stored data.

A method for collecting biological signals with the PPG sensor module includes irradiating light of a particular wavelength band to the human body, detecting the pulse of the user by detecting the reflected or transmitted light, and detecting the position of the wrist of the user based on the detected pulse information. In this embodiment, the PPG sensor module may scan a part of an arm of the user to collect biological signals of the user, and send the collected biological signals to the controller 290. With the PPG sensor module, biological signals of the user may be collected in a non-invasive way, and the pulse may be detected with a single sensor, enabling more convenient collection of biological signals of the user.

The method for collecting biological signals of the user is not limited thereto, but there may be a piezoelectric method using a piezo-element, a magnetic method using a Magnetic Tunnel Junction (MTJ) element, a method using a pressure film sensor, an impedance method using bioelectric impedance, etc.

In some embodiments, the detector 280 may further include a pressure sensor 282 for detecting a position of an elbow of the user. The user may manipulate the input device 200 while resting his/her arm on the arm rest 25, in which case a portion of the arm rest 25 on which the arm is rested may be pressurized. The pressure sensor 282 may output collected pressure data to the controller 290, which may determine a portion detected with the highest pressure to be a position of the elbow based on the collected pressure data. The detector 280 may include various sensors to detect a position of an elbow of the user, in addition to the pressure sensor 282.

Once the position of the elbow is determined based on data obtained from the pressure sensor 282, movement of the bio-signal sensor 281 may be controlled more easily. Specifically, the user has an arm of a length within a predetermined range, and once the position of an elbow of the user is determined, a wrist of the user may be determined to be located within a predetermined distance from the position of the elbow. Accordingly, a position of a wrist of the user may be easily determined by controlling movement of the bio-signal sensor 281 within the predetermined distance from the position of the elbow based on the information about the position of the elbow. However, the movement of the bio-signal sensor 281 should not be necessarily based on the data obtained from the pressure sensor 282. In some other embodiments, the input device 200 may not include the pressure sensor 282.

The memory 270 may store various data, programs, or applications for driving and controlling the input device 200. More specifically, a control program for controlling the input device 200, a dedicated application initially provided by the manufacturer or a universal application downloaded from outside, and/or the like may be stored in the memory 270.

The memory 270 may store information regarding a vein pattern of the portion of a wrist of the user. In an embodiment where the CCD camera module is used for the bio-signal sensor 281, the memory 270 may store vein pattern data of the user extracted from image data collected by the CCD camera module in real time, with pre-learned vein pattern data of the user. The pre-learned vein pattern data of the user may be provided to identify a position of the wrist of the user. The controller 290 as will be described below may identify the position of the wrist of the user by matching the pre-learned vein pattern data of the user and the image data collected in real time, or by using vein branching characteristics.

The memory 270 may also store pulse information of the portion of the wrist of the user. Specifically, the memory 270 may store information regarding a PPG signal obtained in real time by the PPG sensor module. The PPG signal herein refers to a signal that represents a pulse component produced from the heartbeat of the user. The memory 270 may provide the controller 290 with information regarding the PPG signal at the request of the controller 290, and the controller 290 may then determine a portion that comes with the highest amplitude of the PPG signal to be the position of the wrist.

The memory 270 may store information about arm length of the user and information about a position of an elbow of the user obtained from the pressure sensor 282. The memory 270 may provide the controller 290 with the information about a position of the elbow and information about the arm length at the request of the controller 290, and the controller 290 may then control movement of the bio-signal sensor 281 based on the information about a position of the elbow and information about the arm length.

The controller 290 controls general operations of the input device 200. The controller 290 may include one or more processors. The processor may be implemented in arrays of multiple logic gates, or in a combination of a universal microprocessor and a memory that stores a program executable in the microprocessor.

The controller 290 may recognize a control command input through the input module 210 and output a control signal corresponding to the input control command. The control signal may be sent to a corresponding component of the vehicle 100. For example, the controller 290 may recognize a control command input through the input module 210, such as operations of flicking, swiping, rolling, circling, spinning, or tapping, and may output a control signal that corresponds to the control command recognized to operate the corresponding component.

The controller 290 may determine a position of a wrist of the user based on the data collected from the bio-signal sensor 281.

A process of determining a position of the wrist of the user based on the image information collected through the CCD camera module is as follows. First, the CCD camera module collects an image of the wrist of the user through the image capturer, and outputs the collected image to the image processor. The image processor may be integrated in the controller 290, but is not limited thereto. The image processor extracts an image of a region of interest in which veins are intensely distributed from the image obtained from the image capturer, extracts a vein pattern of the wrist of the user from the image of the region of interest, and outputs the extracted vein pattern data to the controller 290. The controller 290 may determine a position of the wrist by comparing the vein pattern data of the wrist obtained from the image processor and vein pattern data of the user stored in the memory 270. The stored vein pattern data of the user may be data obtained by learning vein patterns in the portion of the wrist in advance from images of various people.

A process of determining a position of the wrist of the user based on the image information collected through the PPG sensor module is as follows. First, the PPG sensor module detects reflection or transmission characteristics of the light irradiated onto the portion of the wrist of the user, and outputs the detected data to the controller 290. PPG refers to a signal that represents a pulse component produced from the heartbeat. The reflection or transmission characteristics of light are different depending on the pulse component, and thus the pulse may be detected by analyzing the light characteristics. The controller 290 may determine a position that comes with the highest amplitude of the PPG signal to be the position of the wrist of the user by analyzing the data obtained from the PPG sensor module.

The controller 290 may control movement of the input module 210 based on the information regarding the position of the wrist of the user detected by the detector 280.

For example, the controller 290 may control the input module 210 to be moved to the initial position if there is no need to use the input device 200 as in a situation where the engine of the vehicle 100 is turned off, thereby minimizing contamination of the input device 200. When the vehicle 100 is started again and the input device 200 needs to be used, the controller 290 may control the input module 210 to be moved to a reference position. The reference position herein may refer to a position set up in advance by the user or the manufacturer of the vehicle 100, but is not limited thereto. For example, a position of the input module 210 before the input module 210 is moved to the initial position may be set up to be the reference position, in which case the location of the reference position may vary with the condition.

In another example, the controller 290 may control movement of the input module 210 such that the input module 210 is moved to a position that corresponds to a determined position of the hand H. Specifically, the controller 290 may control the input module 210 to be moved to a point located a predetermined first distance away from the position of the wrist of the user detected by the detector 280. The first distance may be determined by taking into account an average size of the hand H of the user, and may be determined within a range of about 15 cm to about 25 cm in some embodiments. Furthermore, an initial value of the first distance may be determined by the manufacturer while the vehicle is manufactured. In some other embodiments, the initial value of the first distance may be determined by the user.

The controller 290 may control the input module 210 to be moved forward if the position of the input module 210 determined based on the position of the hand H of the user is ahead of the current position of the input module 210, and to be moved backward if the determined position of the input module 210 is behind the current position of the input module 210. In some embodiments, the controller 290 may control the input module 210 to be moved to the right if the determined position of the input module 210 is on the right side of the current position of the input module 210, and to be moved to the left if the determined position of the input module 210 is on the left side of the current position of the input module 210.

In some embodiments, the controller 290 may determine a position of the elbow and control movement of the bio-signal sensor 281 based on the position of the elbow.

The bio-signal sensor 281 may be movably formed in order to more efficiently collect biological signals of the wrist of the user. In order for the bio-signal sensor 281 to detect the position of the wrist of the user with the minimum movement, information about a position of the elbow of the user may be used. The arm length of the user is within a certain range, and when the position of the elbow of the user is determined, a position of the wrist of the user may be determined to be within a predetermined distance from the position of the elbow of the user. In this regard, the controller 290 may control the bio-signal sensor 281 to be moved around the position where the wrist of the user is expected to be located.

Next, another embodiment of the input device 200a will now be described.

Figure 12:
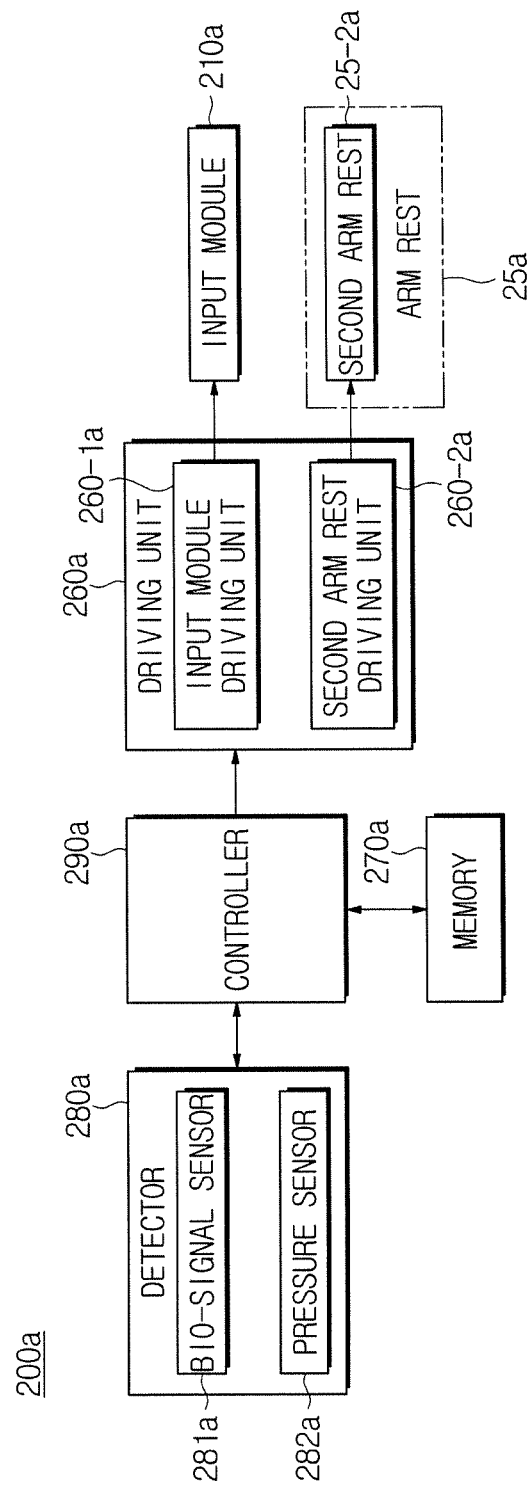
FIG. 12 is a control block diagram of an input device, according to another embodiment of the present disclosure.

FIG. 12 is a control block diagram of the input device 200a, according to another embodiment of the present disclosure. The vehicle 100 may include the same features as shown in FIG. 12, and the following description will focus on features of the input device 200a.

Referring to FIG. 12, the input device 200a may include an arm rest 25a, an input module 210a, a driving unit 260a, a memory 270a, a detector 280a, and a controller 290a. The input device 200a of the embodiment of FIG. 12 is distinguished from the aforementioned input device 200a in that the arm rest 25a is movably formed, and the following description will focus on the difference.

Figure 13:
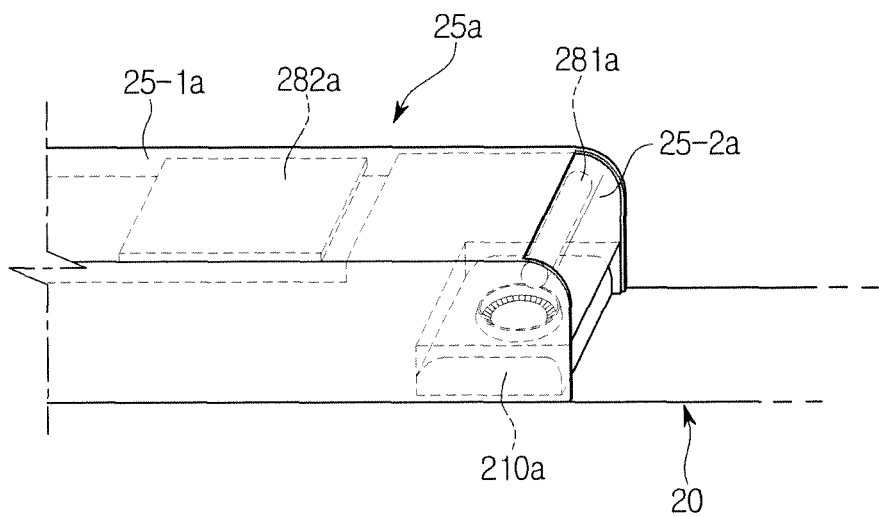
FIG. 13 shows a structure of a dual arm rest of an input device, according to an embodiment of the present disclosure.
Figure 14:
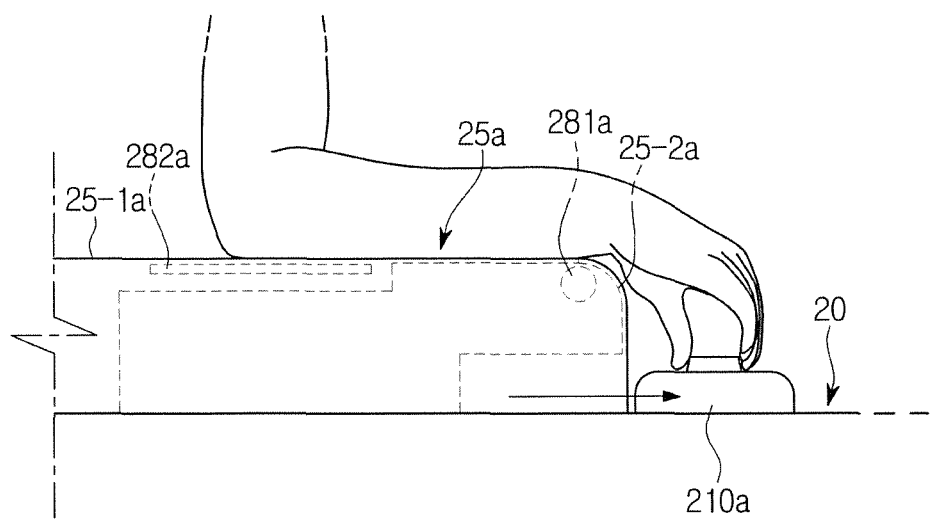
FIGS. 14 and 15 show examples of a movement of an arm rest of an input device.
Figure 15:
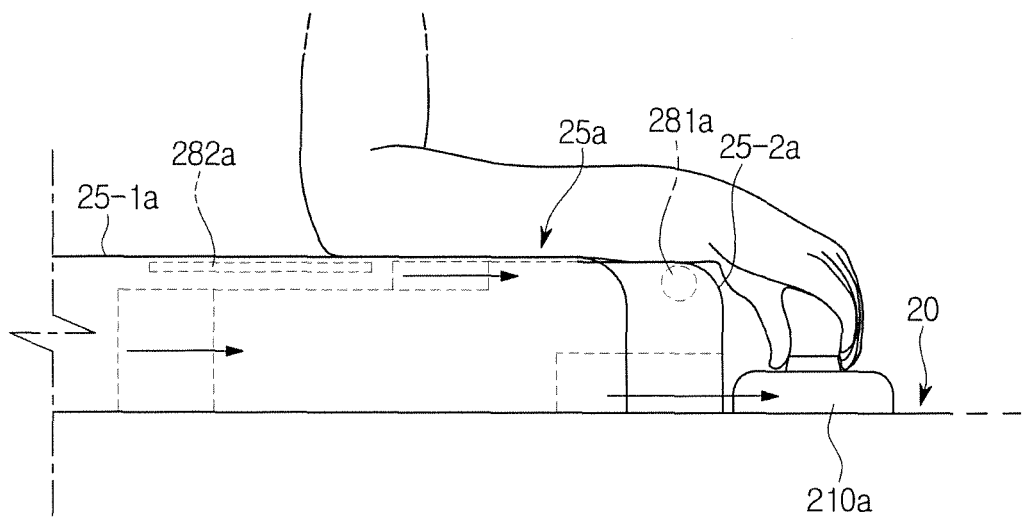

FIG. 13 shows a structure of a dual arm rest 25a of the input device 200a according to another embodiment of the present disclosure, and FIGS. 14 and 15 show an example where a second arm rest 25-2a of the input device 200a is moved.

Referring to FIG. 13, the arm rest 25a of the input device 200a may have a structure of a dual arm rest 25a. Specifically, the arm rest 25a may include a first arm rest 25-1a that constitutes the exterior of the arm rest 25a, and a second arm rest 25-2a placed inside the first arm rest 25-1a.

The first arm rest 25-1a may serve as a housing that forms the exterior of the arm rest 25a and may be placed on the center console 20 in a fixed form. A pressure sensor 282a for collecting data of pressure applied onto the first arm rest 25-1a may be installed inside the first arm rest 25-1a. The pressure sensor 282a may collect data of pressure applied by an arm of the user, and send the data to the controller 290a.

The second arm rest 25-2a may be movably formed inside the first arm rest 25-1a. A bio-signal sensor 281a for collecting biological signals of the user may be installed in the second arm rest 25-2a. Specifically, the bio-signal sensor 281a may be installed at one end of the second arm rest 25-2a where the wrist of the user is naturally placed when the user puts his/her arm on the arm rest 25a. In an embodiment, the bio-signal sensor 281*a* may be formed to be moved back and forth or to the left and right inside the second arm rest 25-2*a*. Alternatively, the bio-signal sensor 281*a* may be formed to be rotated around a fixed rotation axis. In some other embodiments, the bio-signal sensor 281*a* may be formed to be rotated while moving.

The second arm rest 25-2*a* may be formed to be moved back and forth by a second arm rest driving unit 260-2*a*. The second arm rest driving unit 260-2*a* may employ the same scheme as in the driving unit 260 of the input device 200*a* as described in FIGS. 9 to 11, so the description overlapping with what is described in FIGS. 9 to 11 will be omitted herein.

The input module 210*a* may be installed inside the second arm rest 25-2*a*, and the input module 210*a* may be movably formed. Specifically, the input module 210*a* may be formed to be moved back and forth by an input module driving unit 260-1*a*. In the following description, overlapping parts with those described in connection with FIGS. 7 to 11 will be omitted herein.

A method for moving the second arm rest 25-2*a* and the input module 210*a* will now be described in more detail in connection with FIGS. 14 and 15.

As shown in FIG. 14, when the user rests his/her arm on the first arm rest 25-1*a*, the wrist of the user is placed at a position that corresponds to a position of the bio-signal sensor 281*a* located at one end of the second arm rest 25-2*a*. In this case, the second arm rest 25-2*a* may not be moved while the bio-signal sensor 281*a* installed inside the second arm rest 25-2*a* is moving back and forth or to the left and right to collect biological signal data of the user in an embodiment.

The biological signal data of the user collected by the bio-signal sensor 281*a* moving back and forth or to the left and right may be sent to the controller 290*a*. The controller 290*a* may determine a position of the wrist of the user based on the collected biological signal data of the user, and once the position of the wrist of the user is determined, an optimal position of the input module 210*a* may be determined. The optimal position of the input module 210*a* may be determined to be a point located a predetermined first distance away from the position of the wrist of the user. Once the position of the input module 210*a* is determined, the input module 210*a* may be moved to the determined position. The optimal position of the input module 210*a* is a position where it is expected that the user may conveniently manipulate the input module 210*a* there, and the first distance may be programmed in advance by the manufacturer or may vary according to settings of the user. Description overlapping with what is described above is omitted herein.

As shown in FIG. 15, when the user rests his/her arm on the first arm rest 25-1*a*, the wrist of the user is placed away from the bio-signal sensor 281*a* installed in the second arm rest 25-2*a*, making it difficult to determine the position of the wrist of the user. Accordingly, in this case, the second arm rest 25-2*a* may be moved forward for the bio-signal sensor 281*a* to better collect biological signals of the user. In this case, a position of the elbow of the user may be determined by collecting pressure data from a pressure sensor 282*a* installed in the first arm rest 25-1*a*, and a moving distance of the second arm rest 25-2*a* may be determined from the position of the elbow of the user and the data of the user's arm length.

As the second arm rest 25-2*a* is moved forward, the bio-signal sensor 281*a* may collect biological signals of the user more conveniently. More specifically, the bio-signal sensor 281*a* may collect biological signal data of the user while being moved back and forth or to the left and right.

The biological signal data of the user collected by the bio-signal sensor 281*a* moving back and forth or to the left and right may be sent to the controller 290*a*. The controller 290*a* may determine a position of the wrist of the user based on the collected biological signal data of the user, and once the position of the wrist of the user is determined, an optimal position of the input module 210*a* may be determined. In the following description, what is overlapping with FIG. 14 will be omitted.

The detector 280*a* may include the bio-signal sensor 281*a* to detect a position of a wrist of the user. The bio-signal sensor 281*a* may include a CCD camera module, a PPG sensor module, etc. Overlapping descriptions about the CCD camera module and PPG sensor module will be omitted herein.

In some embodiments, the detector 282*a* may further include a pressure sensor 282*a* to detect a position of the elbow of the user. The user may manipulate the input device 200*a* while resting his/her arm on the arm rest 25*a*, in which case a portion of the arm rest 25*a* on which the arm is rested may be pressurized. The pressure sensor 282*a* may output collected pressure data to the controller 290*a*, which may determine a portion with the highest pressure detected to be a position of the elbow based on the collected pressure data.

Once the position of the elbow is determined based on the data obtained from the pressure sensor 282*a*, movement of the second arm rest 25-2*a* and bio-signal sensor 281*a* may be easily controlled. Specifically, the user has an arm of a length within a predetermined range, and if the position of the user's elbow is determined, the user's wrist may be determined to be located within a predetermined distance from the position of the elbow. Accordingly, movement of the second arm rest 25-2*a* may be controlled such that the bio-signal sensor 281*a* is located a predetermined second distance away from the position of the elbow. The second distance may be determined by taking into account an average arm length of the user. The second distance may be determined in advance by the manufacturer in the process of manufacturing the vehicle 100, or may be determined by the user. In some embodiments, after the second arm rest 25-2*a* is moved, movement of the bio-signal sensor 281*a* installed inside the second arm rest 25-2*a* may be controlled back and forth or to the left and right. This is to collect more correct biological signal data of the user.

The controller 290*a* controls general operations of the input device 200*a*. The controller 290*a* may include one or more processors. The processor may be implemented in arrays of multiple logic gates, or in a combination of a universal microprocessor and a memory that stores a program executable in the microprocessor. The controller 290*a* in accordance with the embodiment of the present disclosure may include the features of the controller 290*a* as described above in connection with FIG. 6, so the overlapping description will be omitted herein.

The controller 290*a* may control movement of the second arm rest 25-2*a* based on the pressure information collected from the pressure sensor 282*a*. More specifically, the controller 290*a* may determine a position of the elbow of the user based on the pressure information collected from the pressure sensor 282*a*, and control the second arm rest 25-2*a* to be moved to a point located the predetermined second distance away from the determined position of the elbow. The movement control for the second arm rest 25-2*a* and bio-signal sensor 281*a* is not necessarily based on the data obtained from the pressure sensor 282a, but may be performed using e.g., an infrared sensor.

The input device 200a in accordance with another embodiment has thus far been described.

A method for controlling the vehicle 100 will now be described.

Figure 16:
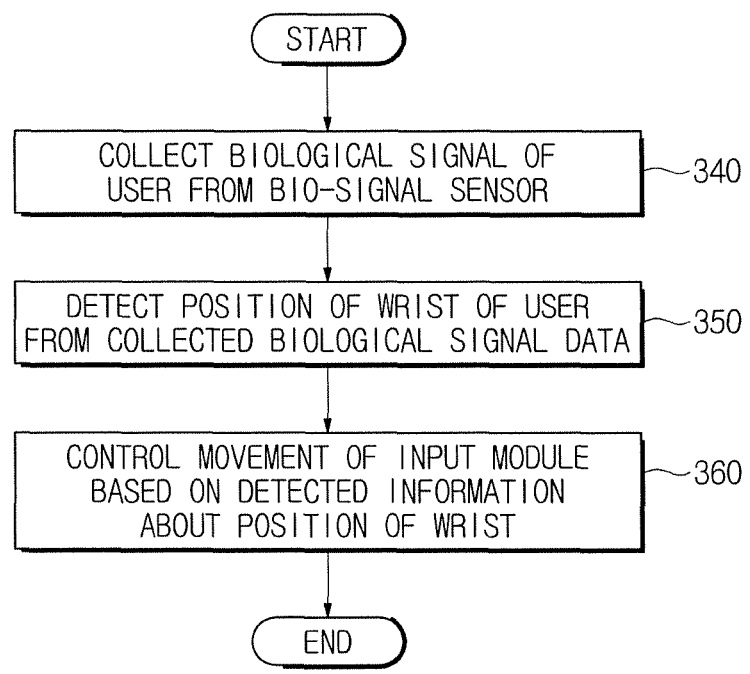
FIG. 16 is a flowchart illustrating a method for controlling a vehicle, according to an embodiment of the present disclosure.

FIG. 16 is a flowchart illustrating a method for controlling the vehicle 100, according to an embodiment of the present disclosure.

Referring to FIG. 16, a method for controlling the vehicle 100 may include collecting a biological signal of the user from the bio-signal sensor 281, in operation 340, detecting a position of a wrist of the user from the collected biological signal data, in operation 350, and controlling movement of the input module 210 based on the detected information about the position of the wrist, in operation 360.

Collecting the biological signal of the user from the bio-signal sensor 281 may include collecting a biological signal around the wrist of the user from the CCD camera module or PPG sensor module. The biological signal of the user may refer to the vein pattern, pulse signal, etc., of the user, but is not limited thereto.

Next, detecting a position of a wrist of the user from the collected biological signal data is performed. In the case that the biological signal of the user is collected through the CCD camera module, the position of the wrist may be determined by comparing the vein pattern of the user obtained by the CCD camera module and stored vein pattern data. In the case that the biological signal of the user is collected through the PPG sensor module, the data obtained from the PPG module may be analyzed and a point that comes with the highest amplitude of the PPG signal from the analysis may be determined to be a position of the wrist of the user, in operation 350.

Next, controlling movement of the input module 210 based on the detected information about the position of the wrist is performed. Controlling movement of the input module 210 may include controlling the input module 210 to be moved to a point located a predetermined first distance away from the position of the wrist. The first distance may be determined taking into account an average size of the hand H of the user, or may be determined within a range of about 15 cm to about 25 cm in some other embodiments, in operation 360.

Figure 17:
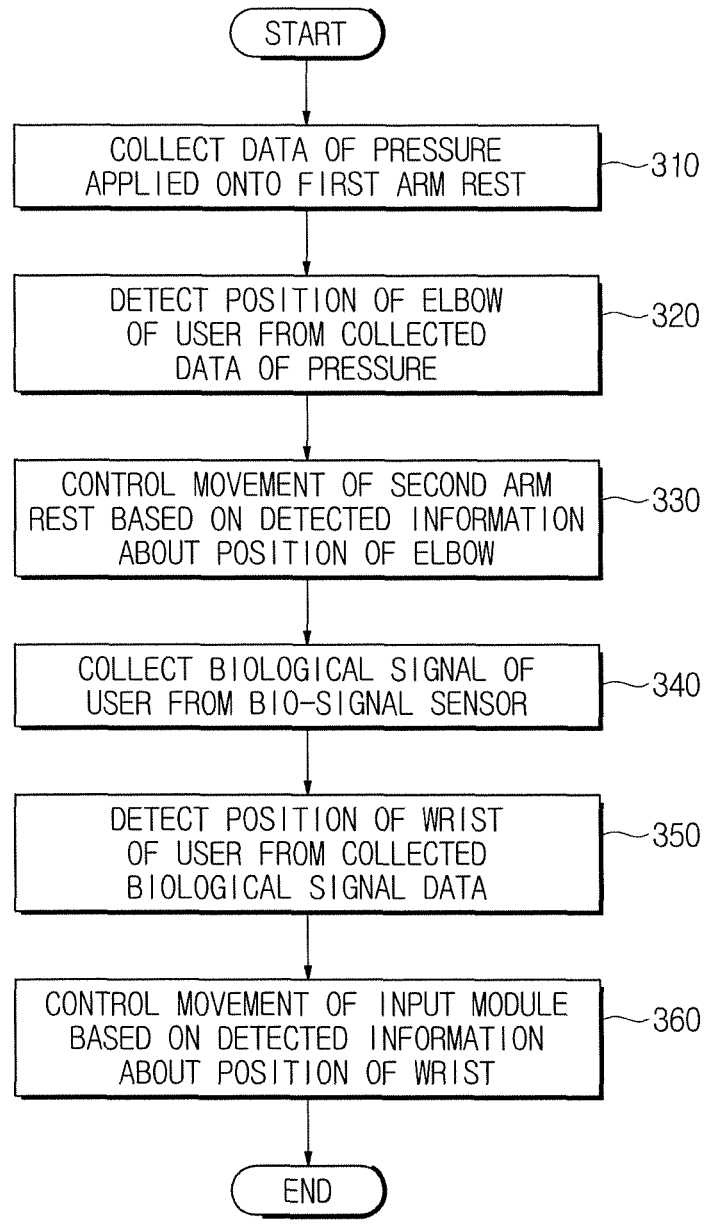
FIG. 17 is a flowchart illustrating a method for controlling a vehicle, according to another embodiment of the present disclosure.

FIG. 17 is a flowchart illustrating a method for controlling the vehicle 100, according to another embodiment of the present disclosure.

Referring to FIG. 17, a method for controlling the vehicle 100 may include, in addition to what is described in connection with FIG. 16, collecting data of pressure applied onto the first arm rest 25, in operation 310, detecting a position of an elbow of the user from the collected data of pressure, in operation 320, and controlling movement of the second arm rest 25 based on the detected information about the position of the elbow of the user, in operation 330.

In the method for controlling the vehicle 100 in accordance with the embodiment of the present disclosure, the vehicle 100 is assumed to have a dual arm rest 25. In this case, biological signals of the user may be more efficiently collected by controlling the second arm rest 25 located inside the first arm rest 25 to be moved back and forth with respect to the vehicle 100.

Specifically, collecting data of pressure applied onto the first arm rest 25 may include collecting data of pressure applied by a hand of the user when the user rests his/her arm on the arm rest 25. The pressure sensor 282 may be installed inside the first arm rest 25 for collecting pressure data and outputting the pressure data to the controller 290, in operation 310.

Next, detecting a position of an elbow of the user from the collected pressure data may be performed. Specifically, the controller 290 may analyze the pressure data obtained from the pressure sensor 282 and determine a point with the highest pressure to be a position of the elbow of the user, in operation 320.

Next, controlling movement of the second arm rest 25 based on the detected information about the position of the elbow of the user may be performed. Specifically, the controller 290 may control the second arm rest 25 to be moved to a point located a predetermined second distance away from the position of the elbow based on the detected information about the position of the elbow. The second distance may be determined taking into account an average arm length of the user, and the description overlapping with what is described above is omitted herein, in operation 330.

The input device 200, vehicle 100 including the input device 200, and method for controlling the vehicle 100 has thus far been described.

According to embodiments of the present disclosure, an input device for vehicle, which is personalized for the driver to easily manipulate, may be provided.

Furthermore, the input device may be actively moved, thereby minimizing visual distraction of the driver for recognition of the input device and additionally providing the driver with emotional values, such as feeling of luxuriousness or modernity.

Several embodiments have thus been described, but it will be understood that various modifications can be made without departing the scope of the present disclosure. Thus, it will be apparent to those ordinary skilled in the art that the disclosure is not limited to the embodiments described, but can encompass not only the appended claims but the equivalents.

What is claimed is:

1. An input device comprising:
an input module;
a bio-signal sensor for detecting a position of a wrist of a user;
a pressure sensor for sensing a position of an elbow of the user;
an arm rest on which the user rests his/her arm; and
a controller for controlling a movement of the input module based on information about the position of the wrist of the user detected by the bio-signal sensor and the position of the elbow of the user sensed by the pressure sensor,
wherein the controller is configured to control a portion of the arm rest having the bio-signal sensor to be moved to a point located a predetermined first distance away from the sensed position of the elbow.

2. The input device of claim 1, wherein the controller is configured to control the input module to be moved to a point located a predetermined second distance away from the position of the wrist of the user detected by the bio-signal sensor.

3. The input device of claim 1, wherein the bio-signal sensor is for collecting a biological signal of the user.

4. The input device of claim 3, wherein the bio-signal sensor comprises at least one selected from a group comprising a Charge Coupled Device (CCD) camera module and a photoplethysmography (PPG) sensor module.

5. The input device of claim 1,
wherein the arm rest includes:
a first arm rest that constitutes an exterior, and
a second arm rest movably formed inside the first arm rest.

6. The input device of claim 5, wherein
the pressure sensor is installed inside the first arm rest for collecting data of pressure applied onto the first arm rest, and
the bio-signal sensor is installed inside the second arm rest for collecting a biological signal of the user.

7. The input device of claim 6, wherein the bio-signal sensor is movably formed inside the second arm rest.

8. The input device of claim 6, wherein the controller is configured to control movement of the second arm rest based on pressure information collected from the pressure sensor.

9. The input device of claim 8, wherein the controller is configured to control the arm rest to be moved to a point located a predetermined third distance away from the determined position of the elbow.

10. The input device of claim 1, wherein the controller is configured to control the input module to be moved to a predetermined reference position if the vehicle is started.

11. The input device of claim 1, wherein the controller is configured to control the input module to be moved to a predetermined initial position if an engine of the vehicle is turned off.

12. A vehicle comprising:
an input module for receiving a control command;
a bio-signal sensor for detecting a position of a wrist of a user;
a pressure sensor for sensing a position of an elbow of the user;
an arm rest on which the user rests his/her arm; and
a controller for controlling a movement of the input module based on information about the position of the wrist of the user detected by the bio-signal sensor and the position of the elbow of the user sensed by the pressure sensor,
wherein the controller is configured to control a portion of the arm rest having the bio-signal sensor to be moved to a point located a predetermined first distance away from the sensed position of the elbow.

13. The vehicle of claim 12, wherein the controller is configured to control the input module to be moved to a point located a predetermined second distance away from the position of the wrist of the user detected by the bio-signal sensor.

14. The vehicle of claim 12, wherein the bio-signal sensor is for collecting a biological signal of the user.

15. The vehicle of claim 12,
wherein the arm rest includes
a first arm rest that constitutes an exterior, and
a second arm rest movably formed inside the first arm rest.

16. The vehicle of claim 15, wherein:
the pressure sensor is installed inside the first arm rest for collecting data of pressure applied onto the first arm rest, and
the bio-signal sensor is installed inside the second arm rest for collecting a biological signal of the user.

17. The vehicle of claim 16, wherein the bio-signal sensor is movably formed inside the second arm rest.

18. A method for controlling a vehicle including an input module and an arm reset, the method comprising steps of:
collecting, by a bio-signal sensor, a biological signal of a user;
collecting, by a pressure sensor, a data of pressure of the user;
detecting a position of a wrist of the user from the collected biological signal data and a position of an elbow of the user from the collected data of pressure;
controlling a portion of the arm rest having the bio-signal sensor to be moved to a point located a predetermined first distance away from the detected position of the elbow; and
controlling the input module to be moved to a point located a predetermined second distance away from the position of the wrist based on the detected information about the position of the wrist.

19. The method of claim 18, wherein the arm reset comprises a first arm rest that constitutes an exterior and a second arm rest movably formed inside the first arm rest,
the method further comprising: collecting data of pressure applied onto the first arm rest;
controlling the second arm rest to be moved to a point located a predetermined third distance away from the position of the elbow based on the detected information about the position of the elbow.

20. The method of claim 18, wherein the step of collecting, by a bio-signal sensor, a biological signal of a user comprises collecting a biological signal of the user while the bio-signal sensor is moving back and forth.

* * * * *